United States Patent
Bian et al.

(10) Patent No.: US 11,067,749 B2
(45) Date of Patent: Jul. 20, 2021

(54) WAVEGUIDES WITH CLADDING LAYERS OF GRADATED REFRACTIVE INDEX

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

(*) Notice: Subject to any disclaimer, the term of this patent is extended or adjusted under 35 U.S.C. 154(b) by 0 days.

(21) Appl. No.: 16/690,835

(22) Filed: Nov. 21, 2019

(65) Prior Publication Data

US 2021/0157051 A1   May 27, 2021

(51) Int. Cl.
  *G02B 6/138*   (2006.01)
  *G02B 6/122*   (2006.01)
  *G02B 6/136*   (2006.01)

(52) U.S. Cl.
  CPC .............. *G02B 6/122* (2013.01); *G02B 6/136* (2013.01)

(58) Field of Classification Search
  CPC ...... G02B 6/138; G02B 6/1221; G02B 6/125; G02B 6/00
  USPC ......................................................... 385/131
  See application file for complete search history.

(56) References Cited

U.S. PATENT DOCUMENTS

| | | | | |
|---|---|---|---|---|
| 4,961,619 A | * | 10/1990 | Hernandez-Gil | G02B 6/2804 385/130 |
| 5,157,756 A | * | 10/1992 | Nishimoto | G02B 6/125 385/129 |
| 5,297,233 A | * | 3/1994 | Lerminiaux | G02B 6/125 385/27 |
| 5,894,535 A | * | 4/1999 | Lemoff | G02B 6/125 385/14 |
| 5,911,018 A | * | 6/1999 | Bischel | G02F 1/011 385/11 |
| 6,061,487 A | * | 5/2000 | Toyama | G02F 1/3137 385/47 |
| 6,301,282 B1 | * | 10/2001 | Capasso | B82Y 20/00 372/46.01 |
| 6,438,279 B1 | * | 8/2002 | Craighead | G02B 6/136 356/246 |

(Continued)

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

(Continued)

*Primary Examiner* — Kaveh C Kianni
(74) *Attorney, Agent, or Firm* — Thompson Hine LLP; Anthony Canale

(57) ABSTRACT

Structures for a waveguide and methods of fabricating a structure for a waveguide. A first layer and a second layer are positioned in a layer stack on a surface of a waveguide core. The first layer is positioned in the layer stack between the second layer and the surface of the waveguide core. The waveguide core is composed of a first material having a first refractive index, the first layer is composed of a second material having a second refractive index that is less than the first refractive index of the first material, and the second layer is composed of a third material having a third refractive index that is less than the second refractive index of the second material.

17 Claims, 4 Drawing Sheets

(56) References Cited

U.S. PATENT DOCUMENTS

| | | | | |
|---|---|---|---|---|
| 6,542,684 | B2* | 4/2003 | Eldada | G02B 6/1221 385/129 |
| 6,690,871 | B2* | 2/2004 | Lee | G02B 6/10 385/124 |
| 6,785,447 | B2 | 8/2004 | Yoshimura et al. | |
| 6,915,047 | B1* | 7/2005 | Mekis | G02B 6/125 385/14 |
| 6,999,670 | B1* | 2/2006 | Gunn, III | G02F 1/025 385/131 |
| 7,263,247 | B1* | 8/2007 | Hehlen | G02B 6/126 385/14 |
| 7,603,016 | B1* | 10/2009 | Soref | B82Y 20/00 385/129 |
| 7,616,856 | B2 | 11/2009 | Zhou et al. | |
| 7,831,123 | B2* | 11/2010 | Sparacin | G02B 6/132 385/131 |
| 8,192,638 | B2* | 6/2012 | Pomerene | B82Y 20/00 216/24 |
| 9,709,738 | B1* | 7/2017 | Dumais | G02B 6/14 |
| 9,995,877 | B2* | 6/2018 | Nakamura | G02B 6/125 |
| 10,133,094 | B1* | 11/2018 | Yu | G01J 1/0425 |
| 10,185,203 | B1* | 1/2019 | Yu | G01J 5/024 |
| 10,838,240 | B2* | 11/2020 | Yu | G02F 1/017 |
| 2002/0064896 | A1* | 5/2002 | Zhao | C08F 32/08 438/31 |
| 2003/0118286 | A1* | 6/2003 | Kamei | G02B 6/1228 385/37 |
| 2003/0223672 | A1* | 12/2003 | Joyner | G02B 6/12023 385/14 |
| 2004/0126052 | A1* | 7/2004 | Kamei | G02B 6/12011 385/14 |
| 2004/0151423 | A1* | 8/2004 | Izhaky | G02B 6/1228 385/21 |
| 2004/0156589 | A1* | 8/2004 | Gunn, III | G02B 6/124 385/37 |
| 2004/0190830 | A1* | 9/2004 | Rasras | G02B 6/125 385/39 |
| 2005/0047702 | A1* | 3/2005 | Parker | G02F 1/353 385/1 |
| 2006/0023989 | A1* | 2/2006 | Yanagisawa | G02B 6/2938 385/14 |
| 2006/0133716 | A1* | 6/2006 | Little | G02B 6/2804 385/14 |
| 2006/0222283 | A1* | 10/2006 | Salib | G02F 1/0955 385/11 |
| 2006/0251371 | A1* | 11/2006 | Schmidt | G01N 21/6454 385/129 |
| 2007/0092193 | A1* | 4/2007 | Yokino | G02B 6/12007 385/129 |
| 2007/0104422 | A1* | 5/2007 | Watanabe | G02B 6/12009 385/39 |
| 2009/0142019 | A1* | 6/2009 | Popovic | G02B 6/10 385/28 |
| 2010/0166363 | A1* | 7/2010 | Matsuoka | G02B 6/4214 385/14 |
| 2011/0180795 | A1* | 7/2011 | Lo | G02F 1/025 257/51 |
| 2012/0003767 | A1* | 1/2012 | Fujikata | G02F 1/025 438/31 |
| 2012/0201488 | A1* | 8/2012 | Liow | H01L 21/26586 385/3 |
| 2012/0243826 | A1* | 9/2012 | Sun | G02F 1/3138 385/17 |
| 2013/0195397 | A1* | 8/2013 | Kung | G02B 6/134 385/14 |
| 2013/0243374 | A1* | 9/2013 | Watanabe | G02B 6/125 385/24 |
| 2013/0243383 | A1* | 9/2013 | Agarwal | G02B 6/02033 385/126 |
| 2013/0315547 | A1 | 11/2013 | Brun et al. | |
| 2014/0140655 | A1* | 5/2014 | Chakravarty | B82Y 20/00 385/12 |
| 2015/0049978 | A1* | 2/2015 | Fujikata | G02F 1/2257 385/3 |
| 2015/0212268 | A1* | 7/2015 | Goodwill | G02B 6/124 385/14 |
| 2016/0123829 | A1* | 5/2016 | Reck | G01L 9/0076 73/705 |
| 2017/0038530 | A1* | 2/2017 | Inada | G02B 6/122 |
| 2017/0168326 | A1* | 6/2017 | Ogawa | G02F 1/025 |
| 2017/0207600 | A1* | 7/2017 | Klamkin | G02B 6/12002 |
| 2017/0212304 | A1* | 7/2017 | Sacher | G02B 6/12002 |
| 2017/0276872 | A1* | 9/2017 | Nakamura | G02B 6/125 |
| 2017/0299902 | A1* | 10/2017 | Yu | G02F 1/015 |
| 2018/0101082 | A1* | 4/2018 | Yu | H01L 31/03048 |
| 2018/0217469 | A1* | 8/2018 | Yu | G02F 1/2257 |
| 2018/0267237 | A1* | 9/2018 | Oonawa | G02B 6/12004 |
| 2018/0348430 | A1* | 12/2018 | Ogawa | G02F 1/2257 |
| 2019/0179177 | A1* | 6/2019 | Rickman | H04Q 11/0005 |
| 2019/0258094 | A1* | 8/2019 | Oh | G02F 1/025 |
| 2019/0278111 | A1* | 9/2019 | Yu | G02B 6/136 |
| 2019/0293971 | A1* | 9/2019 | Yu | G02F 1/017 |
| 2019/0330482 | A1* | 10/2019 | Williams | C09D 11/322 |
| 2019/0346704 | A1* | 11/2019 | Yu | G02F 1/01708 |
| 2019/0384073 | A1* | 12/2019 | Yu | G02B 6/136 |
| 2019/0384135 | A1* | 12/2019 | Takahashi | G02F 1/2257 |
| 2020/0363662 | A1* | 11/2020 | Yu | G02F 1/01708 |

OTHER PUBLICATIONS

R. Loiacono, F. Dell'Olio and V. M. N. Passaro, "Hollow core waveguides for optical chemical sensing," 2007 2nd International Workshop on Advances in Sensors and Interface, Bari, 2007, pp. 1-5.

Ponnampalam et al., "Self-assembled hollow waveguides with hybrid metal-dielectric Bragg claddings", Optics Express vol. 15, Issue 20, pp. 12595-12604 (2007).

Mashanovich et al., "Silicon photonic waveguides for different wavelength regions", Published May 12, 2008 • 2008 IOP Publishing Ltd, Semiconductor Science and Technology, vol. 23, No. 6.

Loni et al., "Porous silicon multilayer optical waveguides", Thin Solid Films vol. 276, Issues 1-2, Apr. 15, 1996, pp. 143-146.

J. P. R. Lacey and F. P. Payne, "Radiation loss from planar waveguides with random wall imperfections," in IEE Proceedings J—Optoelectronics, vol. 137, No. 4, pp. 282-288, Aug. 1990.

Yusheng Bian et al. "Stacked Waveguide Arrangements Providing Field Confinement", filed Jul. 20, 2018 as U.S. Appl. No. 16/040,896.

Yusheng Bian et al. "Composite Waveguiding Structures Including Semiconductor Fins", filed Dec. 28, 2018 as U.S. Appl. No. 16/234,906.

* cited by examiner

US 11,067,749 B2

WAVEGUIDES WITH CLADDING LAYERS OF GRADATED REFRACTIVE INDEX

BACKGROUND

The present invention relates to photonics chips and, more specifically, to structures for a waveguide and methods of fabricating a structure for a waveguide.

Photonics chips are used in many applications and systems such as data communication systems and data computation systems. A photonics chip integrates optical components, such as waveguides, optical switches, directional couplers, and waveguide bends, and electronic components, such as field-effect transistors, into a unified platform. Among other factors, layout area, cost, and operational overhead may be reduced by the fabrication of both types of components on a shared chip.

On-chip communication and sensing may rely on guiding optical signals through waveguides on the photonics chip to other optical components. Optical signals may propagate as electromagnetic waves guided by waveguides using several different modes that are characterized by distinct properties. Transverse electric (TE) modes are dependent upon transverse electric waves in which the electric field vector is oriented perpendicular to the direction of propagation. Transverse magnetic (TM) modes are dependent upon transverse magnetic waves in which the magnetic field vector is oriented perpendicular to the direction of propagation.

A waveguide may include a waveguide core that has sidewalls. Surface roughness at the sidewalls may introduce significant propagation loss. Lowering the refractive index of the waveguide core may alleviate the propagation loss but may result in reduced confinement.

Improved structures for a waveguide and methods of fabricating a structure for a waveguide are needed.

SUMMARY

In an embodiment of the invention, a structure includes a waveguide core having a surface, and a layer stack including a first layer and a second layer that are positioned on the surface of the waveguide core. The first layer is positioned in the layer stack between the second layer and the surface of the waveguide core. The waveguide core is composed of a first material having a first refractive index, the first layer is composed of a second material having a second refractive index that is less than the first refractive index of the first material, and the second layer is composed of a third material having a third refractive index that is less than the second refractive index of the second material.

In an embodiment of the invention, a method includes forming a waveguide core having a surface, and forming a first layer and a second layer positioned in a layer stack on the surface. The first layer is positioned in the layer stack between the second layer and the surface of the waveguide core. The waveguide core is composed of a first material having a first refractive index, the first layer is composed of a second material having a second refractive index that is less than the first refractive index of the first material, and the second layer is composed of a third material having a third refractive index that is less than the second refractive index of the second material.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
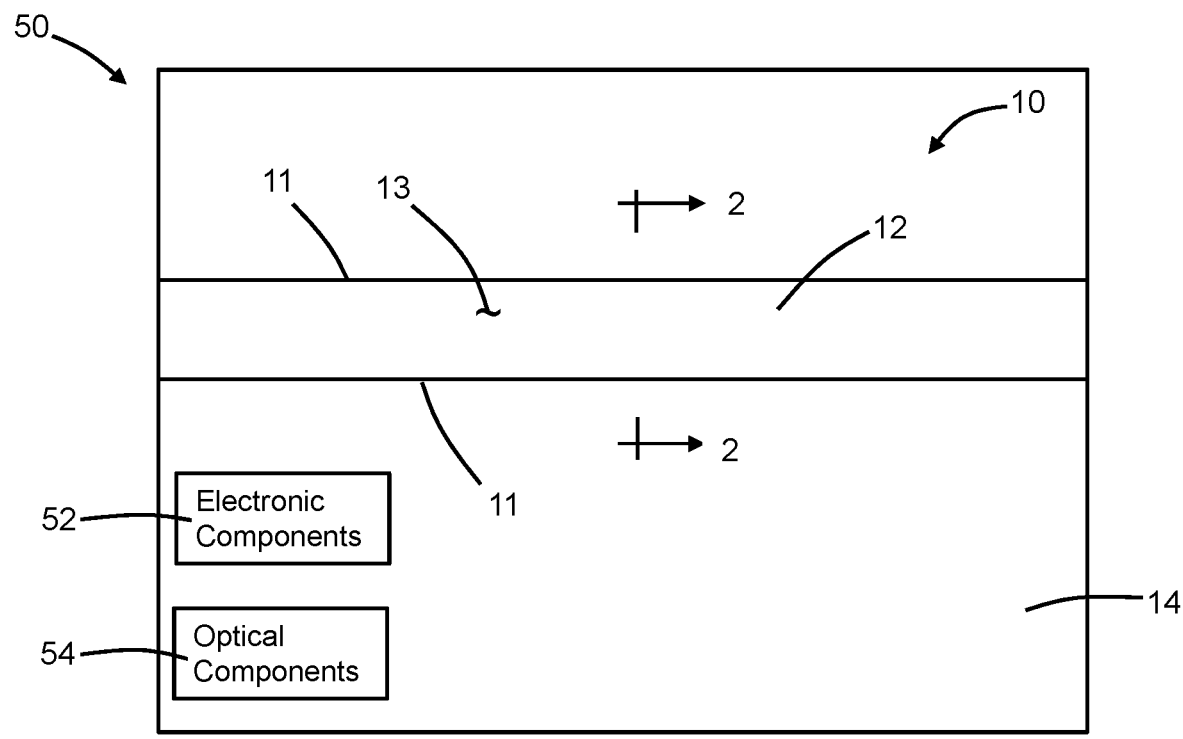
FIG. 1 is a top view of a structure at a fabrication stage of a processing method in accordance with embodiments of the invention.
Figure 2:
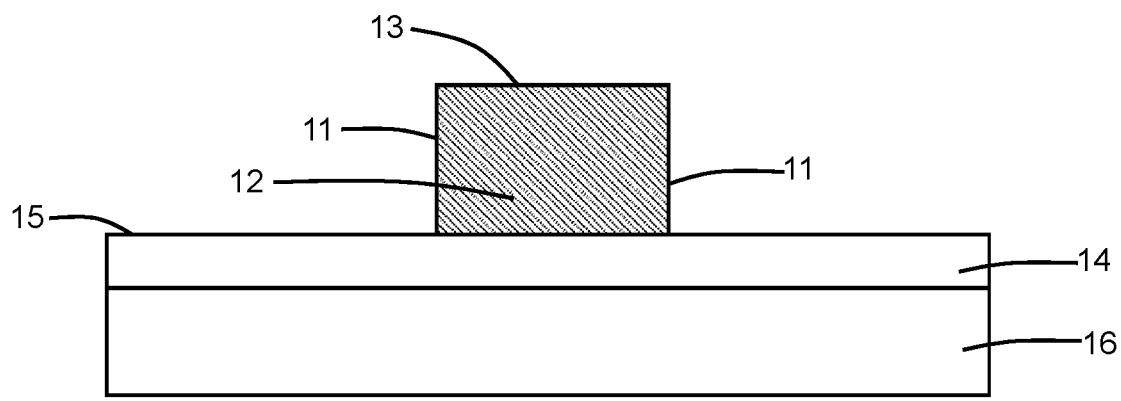
FIG. 2 is a cross-sectional view of the structure taken generally along line 2-2 in FIG. 1.

With reference to FIGS. 1, 2 and in accordance with embodiments of the invention, a waveguiding structure 10 includes a waveguide core 12 that may be positioned over a top surface 15 of a dielectric layer 14. The waveguide core 12 includes sidewalls or side surfaces 11, a top surface 13 that connects the opposite side surfaces 11, and a bottom surface in contact with the top surface 15 of the dielectric layer 14. The dielectric layer 14 may be composed of a dielectric material, such as silicon dioxide. In an embodiment, the dielectric layer 14 may be the buried oxide layer of a silicon-on-insulator (SOI) wafer. The waveguide core 12 may be composed of a single-crystal semiconductor material, such as single-crystal silicon, that is patterned to form the waveguide core 12. In an embodiment, the single-crystal semiconductor material may be single-crystal silicon originating from a device layer of the silicon-on-insulator wafer. The silicon-on-insulator wafer may further include a semiconductor substrate 16 on which the dielectric layer 14 is disposed.

In an alternative embodiment, a slab layer (not shown) may be formed that surrounds the waveguide core 12 and that may be directly connected to a lowermost portion of the waveguide core 12 to define a rib construction instead of the representative ridge construction. The slab layer may be composed of the same single-crystal semiconductor material (e.g., single-crystal silicon) as the waveguide core 21 and may be positioned directly over the dielectric layer 14. When patterning the waveguide core 12, the etching process may be controlled and halted before penetrating fully through the thickness of the patterned semiconductor layer (e.g., device layer) such that the slab layer is formed. In an alternative embodiment, the waveguide core 12 may be composed of a dielectric material, such as silicon nitride.

In the representative embodiment, the waveguide core 12 has a straight shape that that is aligned along a longitudinal axis. In alternative embodiments, the waveguide core 12 may be curved as a bend or may include a bend, the waveguide core 12 may be tapered or include a taper, etc.

Figure 3:
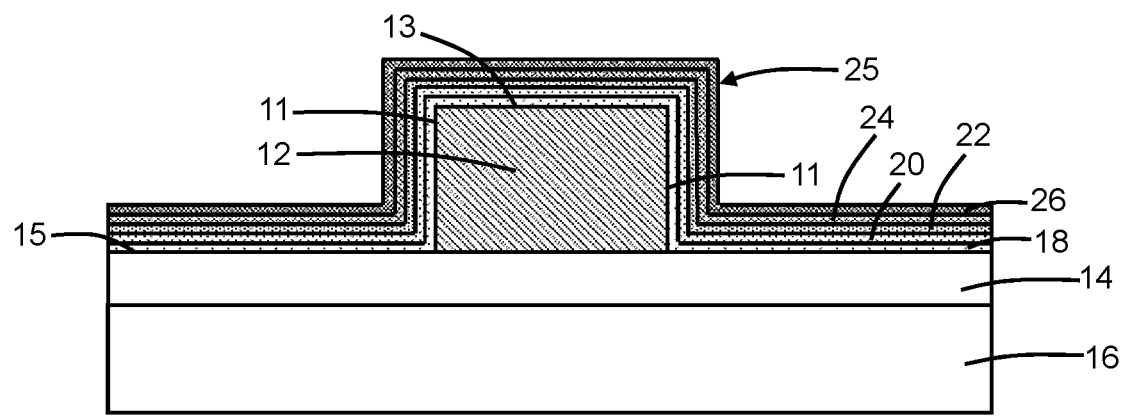
FIG. 3 is a cross-sectional view of the structure at a fabrication stage of the processing method subsequent to FIG. 2.

With reference to FIG. 3 in which like reference numerals refer to like features in FIG. 2 and at a subsequent fabrication stage, a series of layers 18, 20, 22, 24, 26 that are applied as a layer stack 25 positioned on the surfaces 11, 13 of the waveguide core 12. The layers 18, 20, 22, 24, 26 are sequentially formed as conformal layers that overlap with the opposite side surfaces 11 and top surface 13 of the waveguide core 12, and that provide cladding layers for a waveguide formed using the waveguide core 12. The layers 18, 20, 22, 24, 26 also deposit on the top surface 15 of the dielectric layer 14. The layer 18 is positioned in the layer stack 25 between the layers 20, 22, 24, 26 and the surfaces 11, 13 of the waveguide core 12, the layer 20 is positioned in the layer stack 25 between the layers 22, 24, 26 and the surfaces 11, 13 of the waveguide core 12, the layer 22 is positioned in the layer stack 25 between the layers 24, 26 and the surfaces 11, 13 of the waveguide core 12, and the layer 24 is positioned in the layer stack 25 between the layer 26 and the surfaces 11, 13 of the waveguide core 12. The layer 18 may be in direct contact with the surfaces 11, 13 of the waveguide core 12.

Each of the layers 18, 20, 22, 24, 26 may be formed by a conformal deposition technique, such as atomic layer deposition, that produces coatings of uniform thickness. In an embodiment, the conformal thickness of each of the layers 18, 20, 22, 24, 26 may be in a range of two (2) nanometers (nm) to four (4) nm such that the mode of the electromagnetic radiation being guided by the waveguide core 12 is unchanged or substantially unchanged by the addition of the layer stack 25.

The layers 18, 20, 22, 24, 26 may have respective refractive indexes that are different from each other. All of the layers 18, 20, 22, 24, 26 are formed from materials that have refractive indexes that are all less than the refractive index of the material from which the waveguide core 12 is formed. The index of refraction may progressively decrease with increasing distance from the surfaces 11, 13 of the waveguide core 12 such that the refractive index of the layers 18, 20, 22, 24, 26 is gradated. In an embodiment, the refractive index of the material of layer 18 may be less than the refractive index of the material of layer 20, the refractive index of the material of layer 20 may be less than the refractive index of the material of layer 22, the refractive index of the material of layer 22 may be less than the refractive index of the material of layer 24, and the refractive index of the material of layer 24 may be less than the refractive index of the material of layer 26. For example, the layer 18 may be composed of titanium oxide, the layer 20 may be composed of zirconium dioxide, the layer 22 may be composed of hafnium oxide, the layer 24 may be composed of silicon nitride, and the layer 26 may be composed of aluminum oxide, which have refractive indexes gradated with the progressive decrease, higher than the refractive index (3.5) of silicon and lower than the refractive index (1.45) of silicon dioxide that may subsequently be applied (e.g., the dielectric layer 32 (FIG. 4)) over the waveguide core 12 and layers 18, 20, 22, 24, 26. The refractive index changes at the interfaces between the different layers 18, 20, 22, 24, 26 with the associated change of materials, as well as at the interface between the layer 18 and the waveguide core 12 and the interface between the layer 26 and the dielectric layer 32.

Figure 4:
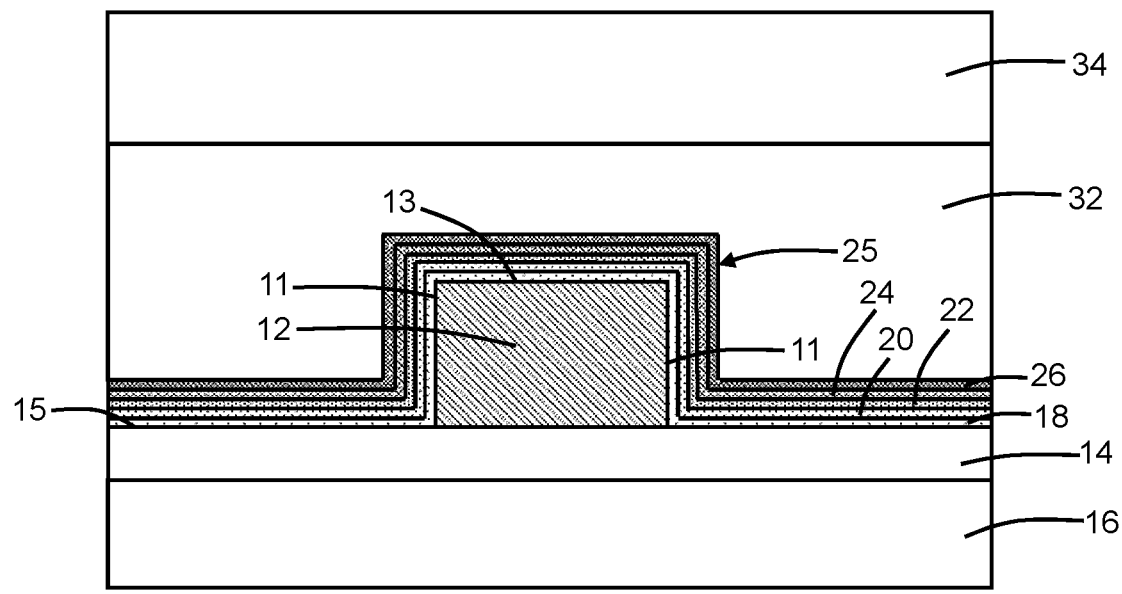
FIG. 4 is a cross-sectional view of the structure at a fabrication stage of the processing method subsequent to FIG. 3.

In an alternative embodiment, only layers 18 and 20 may be applied over the waveguide core 12. For example, the layer 18 may be composed of silicon nitride, and the layer 20 may be composed of aluminum oxide. Both of these materials for the layers 18, 20 have a lower refractive index than the refractive index (3.5) of a waveguide core 12 composed of silicon, and a higher refractive index than the refractive index (1.45) of silicon dioxide subsequently formed as the dielectric layer 32 (FIG. 4). In alternative embodiments, other material combinations may be used for the layers 18, 20 that are characterized by a lower refractive index than silicon, and a higher refractive index than silicon dioxide.

In an alternative embodiment, only layers 18, 20, and 22 may be applied over the waveguide core 12. For example, the layer 18 may be composed of titanium oxide, the layer 20 may be composed of silicon nitride, and the layer 22 may be composed of aluminum oxide. All of these materials for layers 18, 20, 22 have a lower refractive index than the refractive index (3.5) of a waveguide core 12 composed of silicon, and a higher refractive index than the refractive index (1.45) of silicon dioxide subsequently formed as the dielectric layer 32 (FIG. 4).

In an alternative embodiment, only layers 18, 20, 22, and 24 may be applied over the waveguide core 12. For example, the layer 18 may be composed of titanium oxide, the layer 20 may be composed of zirconium oxide, the layer 22 may be composed of silicon nitride, and the layer 24 may be composed of aluminum oxide. All of these materials for layers 18, 20, 22, 24 have a lower refractive index than the refractive index (3.5) of a waveguide core 12 composed of silicon, and a higher refractive index than the refractive index (1.45) of silicon dioxide subsequently formed as the dielectric layer 32 (FIG. 4).

With reference to FIG. 4 in which like reference numerals refer to like features in FIG. 3 and at a subsequent fabrication stage, a dielectric layer 32 is formed on the waveguide core 12 and layers 18, 20, 22, 24, and 26. The waveguide core 12 and the layers 18, 20, 22, 24, 26 are embedded or buried in the dielectric material of the dielectric layer 32 above the level of the dielectric layer 14, and the dielectric layer 32 may be formed in direct contact with the layer 26. The dielectric layer 32 may be composed of a dielectric material, such as silicon dioxide, deposited by chemical vapor deposition and planarized with, for example, chemical mechanical polishing to remove topography. The respective refractive indexes of the layers 18, 20, 22, 24, 26 may each be greater than the refractive index of the material (e.g., silicon dioxide) from which the dielectric layer 32 is formed.

A back-end-of-line stack 34 may be formed on the dielectric layer 32. The back-end-of-line stack 34 may include one or more dielectric layers composed of a dielectric material, such as silicon dioxide or a low-k dielectric material, and metallization composed of a metal, such as copper or cobalt, that is arranged as wiring in the one or more dielectric layers.

The waveguiding structure 10, in any of its embodiments described herein, may be integrated into a photonics chip 50 (FIG. 1) that includes electronic components 52 and optical components 54. For example, the photonics chip 50 may integrate one or more photodetectors representing optical components 54 that receive optical signals carried by the waveguiding structure 10 and convert those optical signals into electrical signals that may be processed by the electronic components 52. The electronic components 52 may include field-effect transistors that are fabricated by CMOS front-end-of-line processes using the device layer of the SOI substrate.

Figure 5:
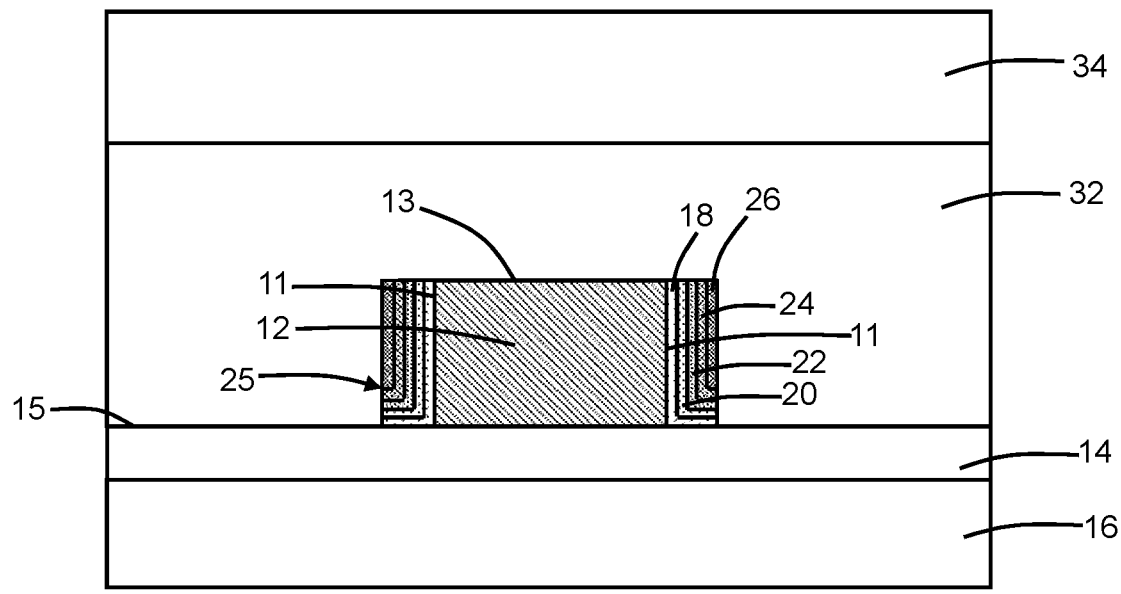
FIGS. 5-8 are cross-sectional views of structures in accordance with alternative embodiments of the invention.

With reference to FIG. 5 in which like reference numerals refer to like features in FIG. 4 and in accordance with alternative embodiments of the invention, portions of the layers 18, 20, 22, 24, 26 may be removed from the top surface 13 of the waveguide core 12 and from the top surface 15 of the dielectric layer 14 using an anisotropic etching process, such as a reactive ion etching process. The portions of the layers 18, 20, 22, 24, 26 are positioned in the layer stack 25 on the side surfaces 11 of the waveguide core 12, which remain following the anisotropic etching process, and define sidewall spacers. The portions of the layers 18, 20, 22, 24, 26 terminate at or below the top surface 13 of the waveguide core 12. The portions of the layers 18, 20, 22, 24, 26 on the side surfaces 11 of the waveguide core 12 extend away from the top surface 15 of the dielectric layer 14 toward the top surface 13 of the waveguide core 12. The dielectric layer 32 directly contacts the top surface 13 of the waveguide core 12, the top surface 15 of the dielectric layer 14, and the remaining portions of the layers 18, 20, 22, 24, 26. Each of the layers 18, 20, 22, 24 includes a foot that extends outwardly from the portions of the layers 18, 20, 22, 24, 26 are positioned on the side surfaces 11 of the waveguide core 12.

Figure 6:
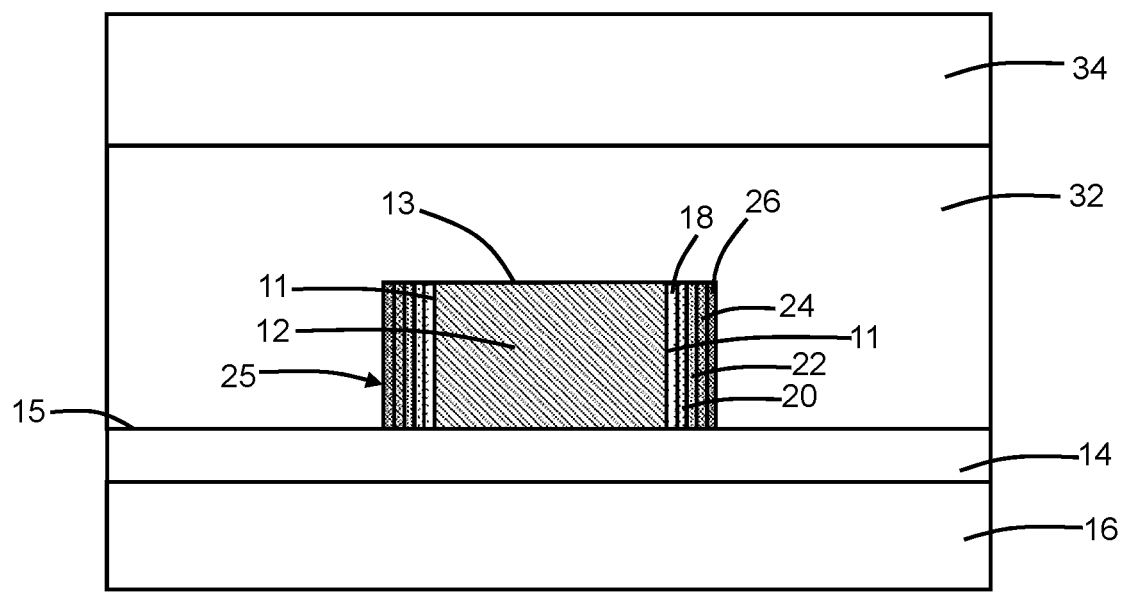

With reference to FIG. 6 in which like reference numerals refer to like features in FIG. 4 and in accordance with alternative embodiments of the invention, each of the layers 18, 20, 22, 24 in the layer stack 25 may be deposited and etched before the next of the layers 20, 22, 24, 26 is deposited and etched. Each etching process may be an anisotropic etching process, such as a reactive ion etching process, characterized by directionality. After the iterations of deposit and etch are completed, the layers 18, 20, 22, 24, 26 are removed from the top surface 13 of the waveguide core 12 and from the top surface 15 of the dielectric layer 14. The portions of the layers 18, 20, 22, 24, 26 are positioned on the side surfaces 11 of the waveguide core 12, which remain following the anisotropic etching process, and define sidewall spacers. The portions of the layers 18, 20, 22, 24, 26 terminate at or below the top surface 13 of the waveguide core 12 at one end and at the top surface 15 of the dielectric layer 14 at an opposite end. The portions of the layers 18, 20, 22, 24, 26 on the side surfaces 11 of the waveguide core 12 extend away from the top surface 15 of the dielectric layer 14 toward the top surface 13 of the waveguide core 12. The dielectric layer 32 directly contacts the top surface 13 of the waveguide core 12, the top surface 15 of the dielectric layer 14, and the remaining portions of the layers 18, 20, 22, 24, 26.

Figure 7:
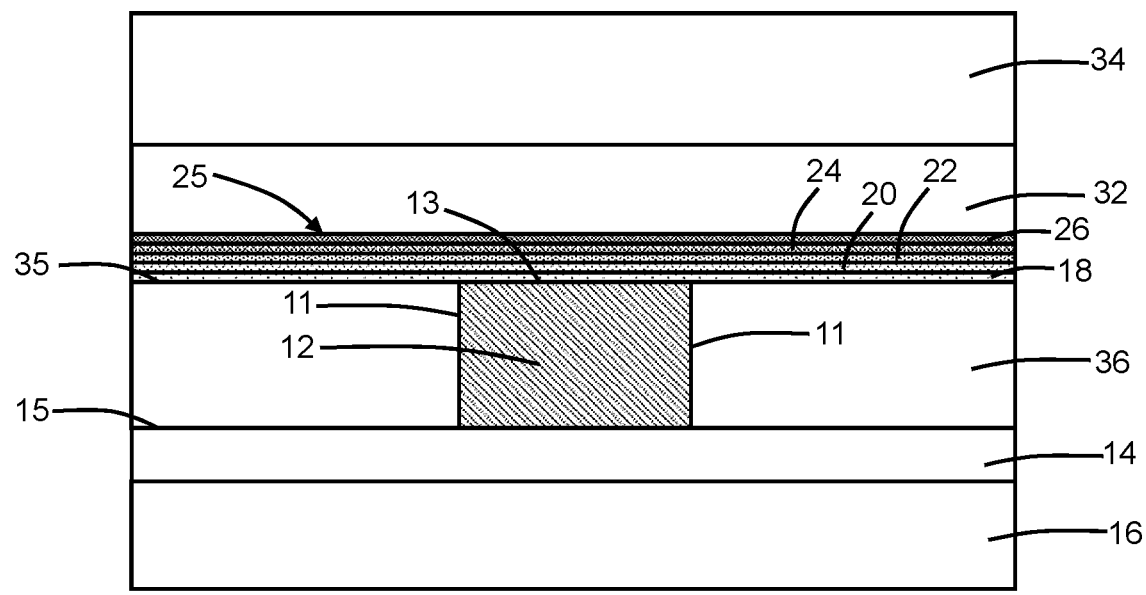

With reference to FIG. 7 in which like reference numerals refer to like features in FIG. 4 and in accordance with alternative embodiments of the invention, a dielectric layer 36 may be deposited over the dielectric layer 14 and waveguide core 12, and planarized to the top surface 13 of the waveguide core 12. The layers 18, 20, 22, 24, 26 of the layer stack 25 may be sequentially deposited on the planarized top surface 13 of the waveguide core 12 and the surrounding planarized top surface 35 of the dielectric layer 36. Because of the coplanar top surfaces 13, 35, the layers 18, 20, 22, 24, 26 do not acquire the topography of the waveguide core 12. The respective refractive indexes of the layers 18, 20, 22, 24, 26 may each be greater than the refractive index of the material (e.g., silicon dioxide) from which the dielectric layer 32 is formed. The layers 18, 20, 22, 24, 26 directly contact the top surface 13 of the waveguide core 12 and are arranged over the side surfaces 11 of the waveguide core 12 in a non-contacting relationship.

Figure 8:
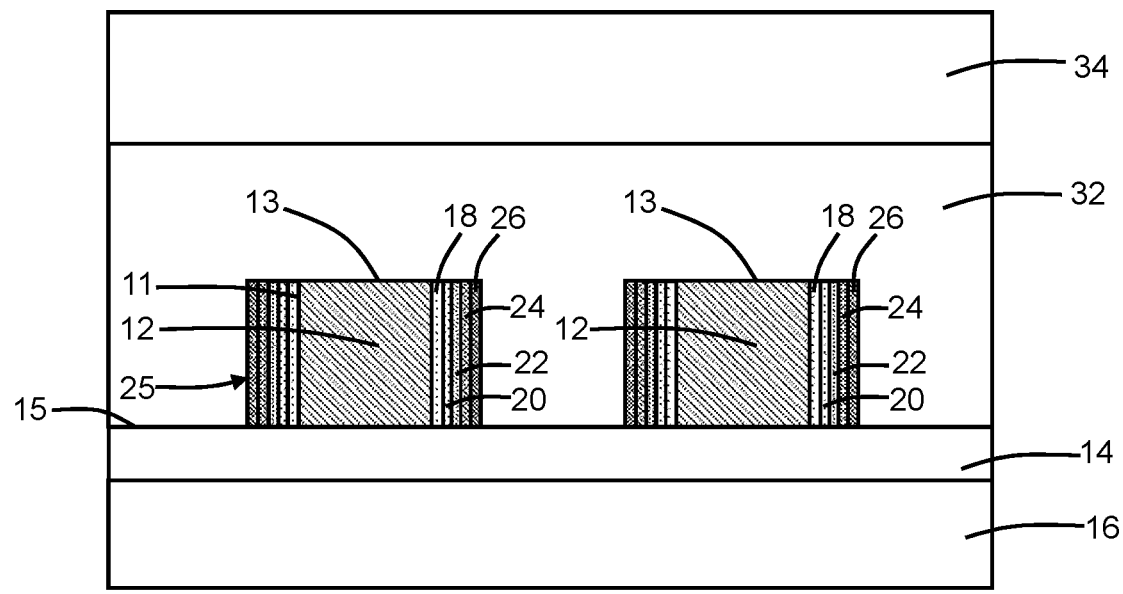

With reference to FIG. 8 in which like reference numerals refer to like features in FIG. 6 and in accordance with alternative embodiments of the invention, an additional waveguide core 42 may be arranged adjacent to the waveguide core 12. The layers 18, 20, 22, 24, 26 of the layer stack 25 may be applied as sidewall spacers to the waveguide core 42 in the same manner as their application to the waveguide core 12. In an embodiment, the waveguide cores 12, 42 may constitute the individual arms of an optical component, such as a modulator. In alternative embodiments, the layers 18, 20, 22, 24, 26 of the layer stack 25 may be provided as sidewall spacers as shown in FIG. 5, as non-planar coatings as shown in FIG. 4, or as planar coatings as shown in FIG. 7.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A structure comprising:
a waveguide core having a first surface;
a layer stack including a first layer, a second layer, and a third layer that are positioned on the first surface of the waveguide core, the first layer positioned in the layer stack between the second layer and the first surface of the waveguide core, and the second layer positioned in the layer stack between the third layer and the first layer; and
a first dielectric layer over the waveguide core and the layer stack, wherein the waveguide core is comprised of silicon having a first refractive index, the first layer is comprised of titanium oxide having a second refractive index that is less than the first refractive index of the silicon, the second layer is comprised of silicon nitride having a third refractive index that is less than the second refractive index of the titanium oxide, the third layer is comprised of aluminum oxide having a fourth refractive index that is less than the third refractive index of the silicon nitride, and the first dielectric layer is comprised of silicon dioxide having a fifth refractive index that is less than the fourth refractive index of the aluminum oxide.

2. The structure of claim 1 wherein the waveguide core has a second surface, and the first layer, the second layer, and the third layer are positioned on the second surface of the waveguide core with the first layer between the second layer and the first surface and with the second layer between the third layer and the first layer.

3. The structure of claim 2 further comprising:
a second dielectric layer,
wherein the waveguide core is positioned on the second dielectric layer, and the first surface is a sidewall that extends from the second dielectric layer to the second surface.

4. The structure of claim 3 wherein the first layer, the second layer, and the third layer are conformal layers that coat the first surface and the second surface.

5. The structure of claim 2 further comprising:
a second dielectric layer,
wherein the waveguide core is positioned on the second dielectric layer, the first surface is a first sidewall that extends away from the second dielectric layer, and the second surface is a second sidewall that extends away from the second dielectric layer.

6. The structure of claim 5 wherein the waveguide core includes a third surface, the first sidewall and the second sidewall extend from the second dielectric layer to the third surface, and the first layer, the second layer, and the third layer each terminate at or below the third surface.

7. The structure of claim 5 wherein the waveguide core includes a third surface, the first sidewall and the second sidewall each extend from the second dielectric layer to the third surface, and the first layer, the second layer, and the third layer are positioned on the third surface with the first layer between the second layer and the third surface.

8. The structure of claim 7 wherein the first layer, the second layer, and the third layer are conformal layers that coat the first surface, the second surface, and the third surface.

9. The structure of claim 7 wherein the first layer, the second layer, and the third layer are positioned on the second dielectric layer with the first layer between the second layer and the second dielectric layer.

10. The structure of claim 1 wherein the first layer, the second layer, and the third layer each have a thickness in a range of two nanometers to four nanometers.

11. The structure of claim 1 wherein the first layer is in direct contact with the first surface of the waveguide core.

12. The structure of claim 1 wherein the layer stack includes a fourth layer positioned between the first layer and the second layer, and the fourth layer is comprised of zirconium oxide.

13. The structure of claim 12 wherein the layer stack includes a fifth layer positioned between the second layer and the fourth layer, and the fourth layer is comprised of hafnium oxide.

14. A method comprising:
forming a waveguide core having a surface;
forming a first layer, a second layer, and a third layer positioned in a layer stack on the surface; and
forming a dielectric layer over the waveguide core and the layer stack,
wherein the first layer is positioned in the layer stack between the second layer and the surface of the waveguide core, the second layer positioned in the layer stack between the third layer and the first layer, the waveguide core is comprised of silicon having a first refractive index, the first layer is comprised of titanium oxide having a second refractive index that is less than the first refractive index of the silicon, the second layer is comprised of silicon nitride having a third refractive index that is less than the second refractive index of the titanium oxide, the third layer is comprised of aluminum oxide having a fourth refractive index that is less than the third refractive index of the silicon nitride, and the dielectric layer is comprised of silicon dioxide having a fifth refractive index that is less than the fourth refractive index of the aluminum oxide.

15. The method of claim 14 further comprising:
etching the first layer, the second layer, and the third layer to form a sidewall spacer on the surface of the waveguide core.

16. The method of claim 14 wherein the layer stack includes a fourth layer positioned between the first layer and the second layer, and the fourth layer is comprised of zirconium oxide.

17. The method of claim 16 wherein the layer stack includes a fifth layer positioned between the second layer and the fourth layer, and the fourth layer is comprised of hafnium oxide.

* * * * *